(12) United States Patent
Wase et al.

(10) Patent No.: US 7,908,998 B2
(45) Date of Patent: Mar. 22, 2011

(54) GRIPPER DEVICE, ROBOT ARM, AND MILKING ROBOT

(75) Inventors: Lars Wase, Danderyd (SE); Mats Nilsson, Tumba (SE); Nils Erik Holmertz, Huddinge (SE); Jan-Erik Andersson, Södertälje (SE); Krister Sjöblom, Ösmo (SE); Mattias Oscarsson, Stockholm (SE)

(73) Assignee: Delaval Holding AB, Tumba (SE)

( * ) Notice: Subject to any disclaimer, the term of this patent is extended or adjusted under 35 U.S.C. 154(b) by 985 days.

(21) Appl. No.: 11/630,247

(22) PCT Filed: Jun. 16, 2005

(86) PCT No.: PCT/SE2005/000930
§ 371 (c)(1),
(2), (4) Date: Dec. 21, 2006

(87) PCT Pub. No.: WO2005/122753
PCT Pub. Date: Dec. 29, 2005

(65) Prior Publication Data
US 2008/0022933 A1 Jan. 31, 2008

(30) Foreign Application Priority Data
Jun. 22, 2004 (SE) .................................. 0401611

(51) Int. Cl.
*A01J 5/017* (2006.01)
(52) U.S. Cl. .................................. 119/14.08; 119/14.18
(58) Field of Classification Search ............... 119/14.01, 119/14.08, 14.1, 14.11, 14.13, 14.18, 14.28, 119/14.46–14.48
See application file for complete search history.

(56) References Cited

U.S. PATENT DOCUMENTS

| 5,042,428 A | * | 8/1991 | Van der Lely et al. | ..... 119/14.08 |
| 5,865,138 A | * | 2/1999 | van der Lely | ............... 119/14.02 |
| 5,909,716 A | | 6/1999 | Van Der Lely | |

FOREIGN PATENT DOCUMENTS

| CN | 201056445 Y | * | 5/2008 |
| CN | 201056458 Y | * | 5/2008 |
| EP | 0535755 | | 4/1993 |
| EP | 0551956 | | 7/1993 |
| JP | 08281431 A | * | 10/1996 |
| WO | 96/07314 | | 3/1996 |
| WO | 00/72665 | | 12/2000 |

OTHER PUBLICATIONS

International Search Report (PCT/ISA/210).

* cited by examiner

*Primary Examiner* — Kimberly S Smith
(74) *Attorney, Agent, or Firm* — Harness, Dickey & Pierce, P.L.C.

(57) ABSTRACT

A gripper device mountable on a robot arm (10) of a milking robot (2) provided for automatically attach teat cups (5) to the teats of a milking animal, the gripper device comprises an electromagnet (6) from gripping teat cups made of a magnetic material, the electromagnet including a coil (31) feedable with a current a core (33) of a magnetic material arranged at least partly within the coil; and a support structure (7) for holding the electromagnet. The core comprises two end and portions (33*a-b*) in a single face of the electromagnet, wherein the two end portions constitute different poles of the electromagnet, and are shaped to be engagable with each of the teat cups in a close fit.

28 Claims, 5 Drawing Sheets

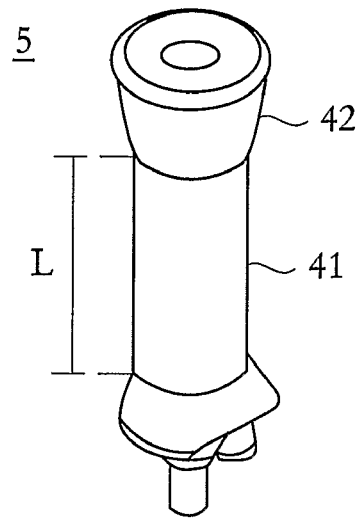
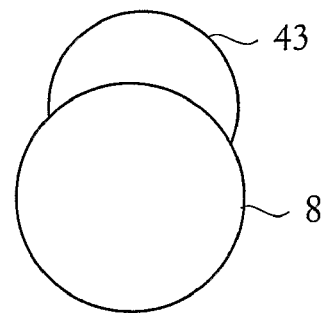
Fig. 4a          Fig. 4b
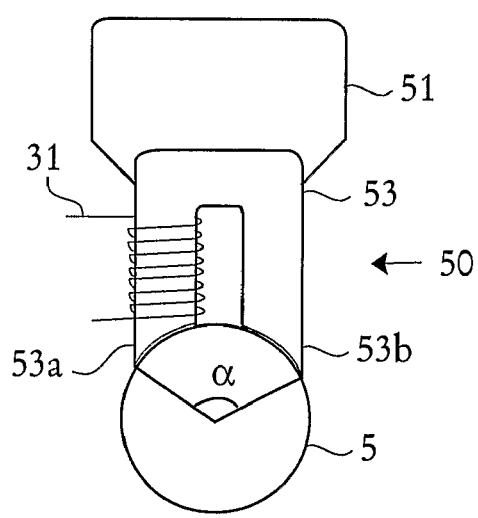
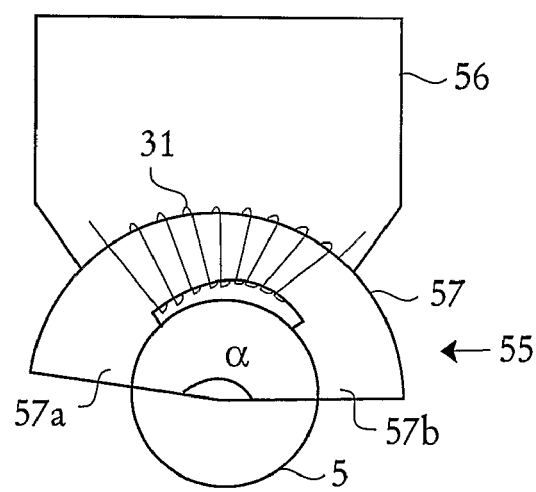
Fig. 5a          Fig. 5b

GRIPPER DEVICE, ROBOT ARM, AND MILKING ROBOT

TECHNICAL FIELD OF THE INVENTION

The present invention generally relates to the field of animal arrangements, preferably but not exclusively intended for cows, and more specifically the invention relates to a gripper device, to a robot arm having the gripper device mounted, and to a milking robot comprising the robot arm.

DESCRIPTION OF RELATED ART

WO 00/72665 A1 (DELAVAL) discloses an apparatus for an animal related operation, comprising a control unit controlling the milking process, an automatic milking device with a carrier member adapted to carry at least one teat cup which is connectable to the teat of the udder of an animal to be milked. Said teat cup is connectable with said carrier member by means of at least one magnetic feature holding means and arranged at said carrier member for carrying said at least one teat cup between a holding means of said automatic milking device and the teat of the udder of an animal to be milked.

EP 0 551 956 A1 (VAN DER LELY) discloses an implement for automatically milking an animal, comprising a milking robot with a carrier member adapted to carry four teat cups which are connectable automatically to the teats of the udder of an animal to be milked, characterized in that the teat cups are connected to the carrier member by means of a number of on/off switchable electromagnets. This construction is particularly advantageous in the case that the teat cups to be uncoupled from the relevant teats after milking are pulled against or onto the carrier member by means of cylinders and flexible members, such as cables or a belt, as than the teat cups can be hold against or onto the carrier member by means of the electromagnets and the cylinders be inactivated.

WO 96/07314 (MAASLAND) discloses a gripper comprising a block-shaped holder which is rotatable about a vertical shaft and which is, at the end, provided with a seating recess curved in accordance with the shell of a teat cup. In the vicinity of the curved recess, in the block-shaped holder, there is provided a curved electromagnet which may be energized or not, see FIGS. 5-6 of the publication. The teat cup is capable of being firmly and rapidly seized simply by energizing the electromagnet, and it is simply disengaged by de-energizing the electromagnet.

SUMMARY OF THE INVENTION

While the documents described above disclose the use of electromagnets in gripper devices in general, they fail to disclose any particular embodiment whatsoever that is believed to operate appropriately. A gripper device has not only to be capable of gripping and holding teat cups firmly, but also to withstand forces exerted on the teat cups while they are moved and attached to the teats of the milking animal.

For instance, the magnetic feature holding means as disclosed in WO 00/72665 has been verified to be much to poor to be capable of firmly holding a teat cup. The curved electromagnet disclosed in WO 96/07314 is only schematically described and it seems to be located at a distance from the surface of the gripper device, and necessitates therefore high currents to produce the magnetic forces required.

It is therefore an object of the present invention to provide a gripper device mountable on a robot arm of a milking robot provided for automatically attach teat cups to the teats of a milking animal, which overcomes the above-identified problems associated with the prior art.

In this respect it is a particular object of the invention to provide a gripper device, which can hold a teat cup firmly and can withstand forces of up to about 70-100 N caused e.g. by kicks from the milking animal.

It is a further object of the invention to provide a gripper device, which is capable of firmly gripping and holding a teat cup in a uniquely identified position and orientation irrespective of the position and orientation, particularly inclination, of the teat cup prior to being gripped.

It is still a further object of the invention to provide a gripper device, which has few moving parts, and which is uncomplicated, reliable, and inexpensive to manufacture, assemble, and use.

It is yet a further object of the invention to provide a robot arm having a gripper device mounted thereon, which fulfills at least some of the above objects.

It is still a further object of the invention to provide a milking robot comprising a robot arm equipped with a gripper device, which fulfills the above objects.

These objects, among others, are according to the present invention attained by gripper devices, robot arms, and milking robots as specified in the appended claims.

In accordance with a first aspect of the invention, a gripper device mountable on a robot arm of a milking robot provided for automatically attach teat cups to the teats of a milking animal is provided. The gripper device comprises an electromagnet for gripping teat cups made of a magnetic material, and a support structure for holding the electromagnet. The electromagnet includes a coil feedable with a current and a core of a magnetic material arranged at least partly within the coil. The core comprises at least two end portions in a single face of the electromagnet, wherein the at least two end portions constitute different poles of the electromagnet, and are shaped to be engagable with each of the teat cups in a close fit.

Preferably, the two end portions are arranged to be in contact with a teat cup while the teat cup is gripped by the electromagnet.

Preferably, the teat cups comprise each a cylinder with a substantially circular cross section, and the two end portions are curved with a radius of curvature substantially equal to the radius of the circular cross section.

In a preferred embodiment of the gripper device of the invention the core has a substantially E-shaped cross section with three parallel legs, wherein the coil surrounds the middle one of the three parallel legs, and the three parallel legs are all shaped to engage with a teat cup in a close fit.

In accordance with a second aspect of the invention, a robot arm is provided, which is equipped with the gripper device of the first aspect of the invention.

In accordance with a third aspect of the invention, a milking robot is provided for automatically attach teat cups to the teats of a milking animal to be milked, wherein the milking robot comprises the robot arm of the second aspect of the invention.

Further characteristics of the invention and advantages thereof, will be evident from the following detailed description of preferred embodiments of the present invention given hereinafter and the accompanying FIGS. 1-5, which are given by way of illustration only, and shall thus not limit the scope of the present invention.

BRIEF DESCRIPTION OF THE DRAWINGS

FIG. 4a illustrates, in a perspective view, a teat cup to be gripped by the gripper device of FIG. 2.

FIG. 4b illustrates, in a cross-sectional view, a teat cleaning cup to be gripped by the gripper device of FIG. 2.

FIGS. 5a-c illustrate, in top views, gripper devices according to further preferred embodiments.

DETAILED DESCRIPTION OF EMBODIMENTS

Figure 1:
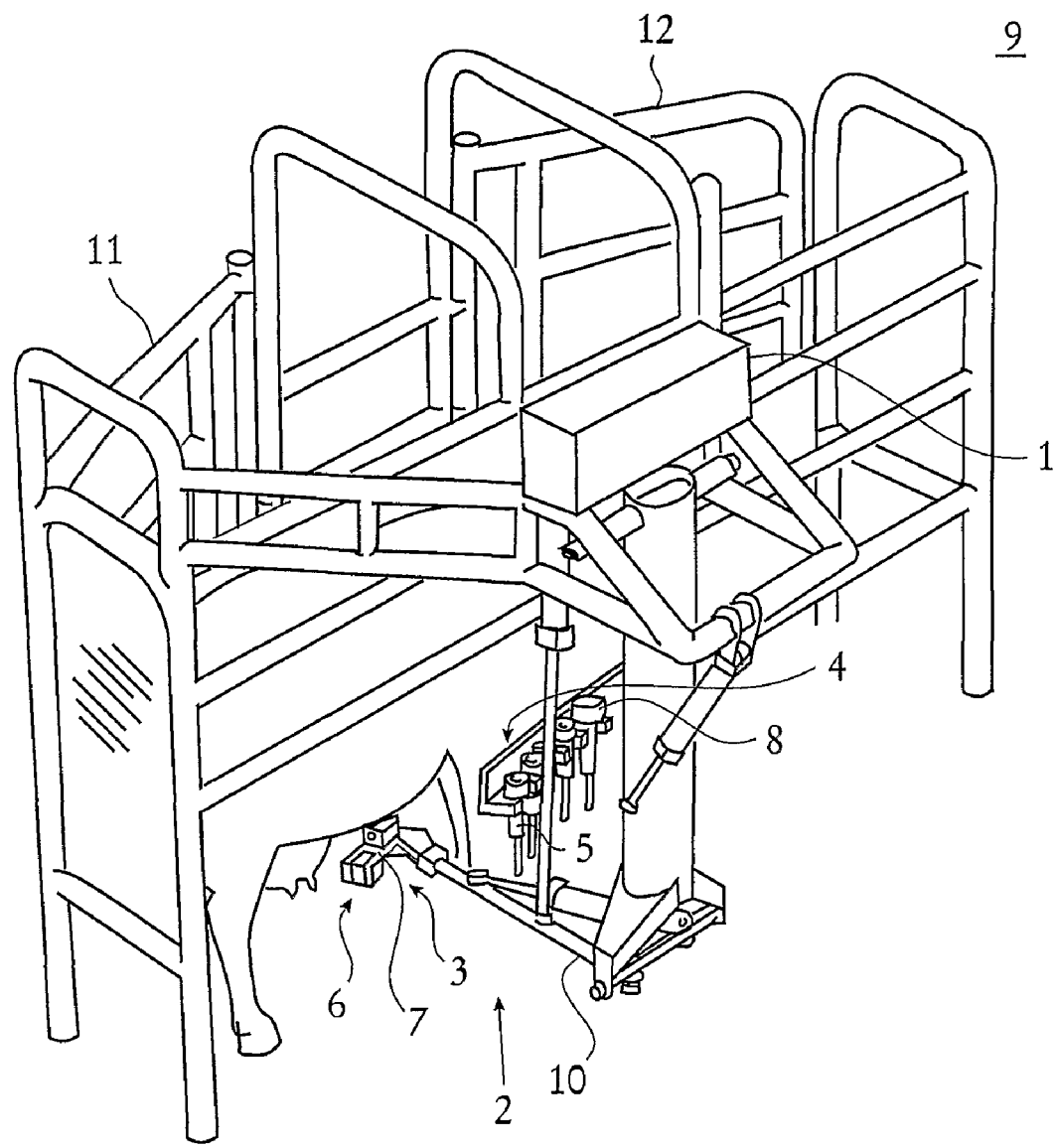
FIG. 1 illustrates, in a perspective view, a milking station comprising a milking robot according to a preferred embodiment of the present invention.

In FIG. 1 is shown a milking system or station arranged for voluntary milking of freely walking animals such as e.g. cows, i.e. the animals enter the milking station 9 in order to be milked on a voluntary basis. The milking station 9 comprises an enclosure having an inlet gate 11 and an outlet gate 12, which are both capable of being opened automatically.

An automatic milking machine (not explicitly illustrated) is provided for milking the cows. The automatic milking machine includes teat cups 5 connected to an end unit by means of milk lines (only the portions attached to the teat cups 5 are shown in FIG. 1).

A milking robot or automatic handling device 2 having a robot arm 10 equipped with a gripper device 3 in its far end is provided to automatically fetch the teat cups 5 of the milking machine from a rack 4, wherein the teat cups 5 are stored, to move them toward the udder of the cow, and to attach them to the teats of the cow. Typically the teat cups 5 are fetched, moved and attached one at a time. The milking robot is typically equipped with a camera system or other detecting device for determining the exact positions of the teats, to which the teat cup 5 are to be attached.

Typically, a teat cleaning device including e.g. a teat cleaning cup 8 may be provided for cleaning the teats of the cow in a sequential order prior to milking. The teat cleaning cup 8 may be stored in the rack 4 or in a separate magazine.

Further, the milking station 9 comprises an identification member provided to identify a cow approaching the milking station 9, and a central processing and control device 1, which is responsible for central processing and controlling of the milking station, which inter alia includes the initiation of various activities in connection with the milking such as e.g. opening and closing of the gates 11 and 12, and control of the milking machine and the milking robot 2. The central processing and control device 1 comprises typically a microcomputer, suitable software, and a database including information of each of the cows milked by the milking machine, such as e.g. when the respective cow was milked last time, when she was fed last time, her milk production, her health, etc.

A cow approaching the milking station is thus identified by the identification member, and the central processing and control device 1 may then, depending on the identification, give the cow access to the milking station 9 by means of opening the inlet gate 11.

When the cow is in the position to be milked, the milking robot 2 fetches the teat cleaning cup 8 from the rack 4, locates the teats of the cow by the camera system, and moves the teat cleaning cup 8 to the located teats, and lifts the teat cleaning cup 8 so that each of the teats of the cow is received by a teat receiving opening of the teat cleaning cup 8 in a sequential order. While each of the teats is being received by the teat receiving opening of the teat cleaning cup 8 that teat is cleaned by the teat cleaning cup device.

When all the teats of the cow have been cleaned and the teat cleaning cup 8 has been removed, the milking robot 2 fetches the teat cups 5 in a sequential order, moves them, by aid of the camera system, to the teats of the cow and applies the teat cups 5 to the teats of the cow.

During milking, milk is drawn from the teats of the cow by means of vacuum being applied to the teat cups 11 via the milk lines, and the milk drawn is collected in the end unit. The milk may then be pumped to a milk storage tank.

The teat cups 5 are typically held in position after having been applied to the teats of the cow by means of the vacuum applied in the teat cups 5. After the milking has been completed the teat cups 5 are removed and the teats of the cow may be subjected to after treatment, e.g. a spray of disinfectant, and then the outlet gate 12 is opened and the cow may leave the milking station 9.

The gripper device 3 of the robot arm, which is intended to grip, hold, and release the teat cups 5 and the teat cleaning cup 8, comprises an electromagnet 6 provided for gripping the teat cups 5. To this end the teat cups 5 have to be made of a magnetic material. A support structure 7, which is mountable to the robot arm 10, is provided for holding the electromagnet 6.

Figure 2:
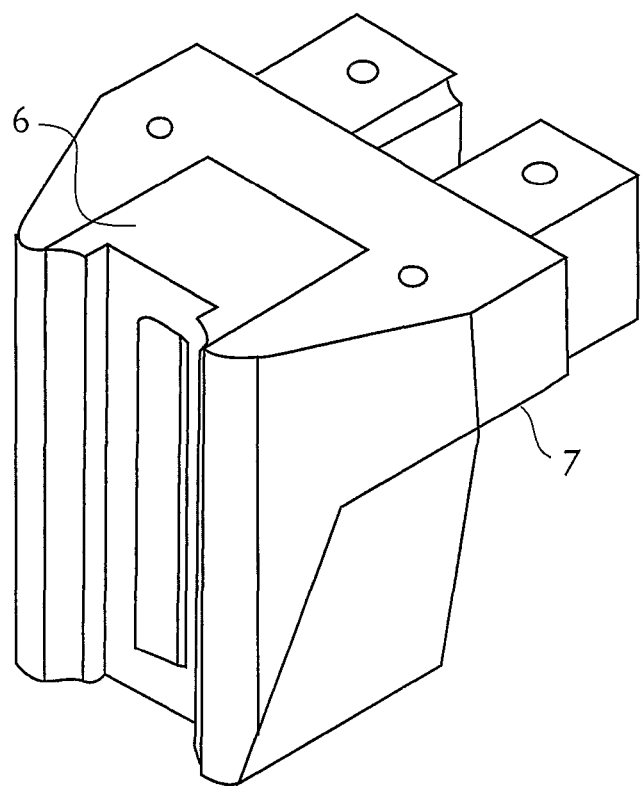
FIG. 2 illustrates, in a perspective view, a gripper device as being comprised in the milking robot of FIG. 1.

The gripper device is illustrated in FIG. 2 in perspective view, and the electromagnet 6 thereof is illustrated in FIGS. 3a-e in various views. The electromagnet 6 includes a coil 31 feedable with a current by an electric circuit 32 and a core 33 of a magnetic material, e.g. iron or steel, arranged at least partly within the coil 31.

Figure 3A:
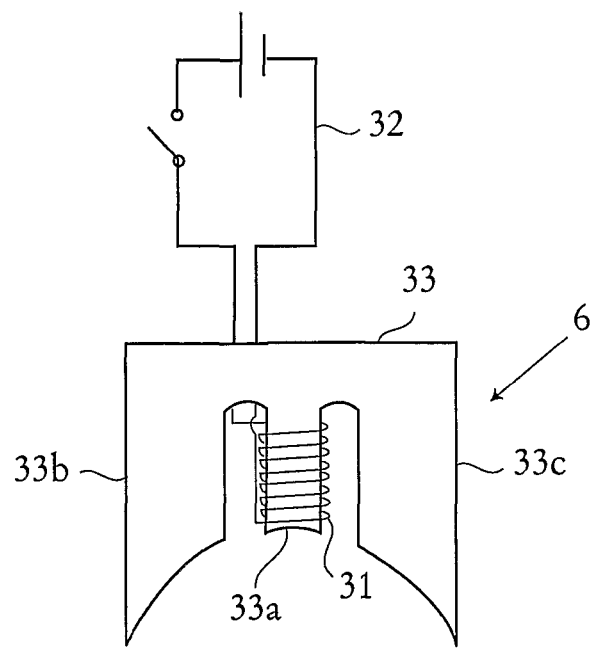
FIG. 3 illustrates, in various views, an electromagnet as being comprised in the gripper device of FIG. 2.
Figure 3B:
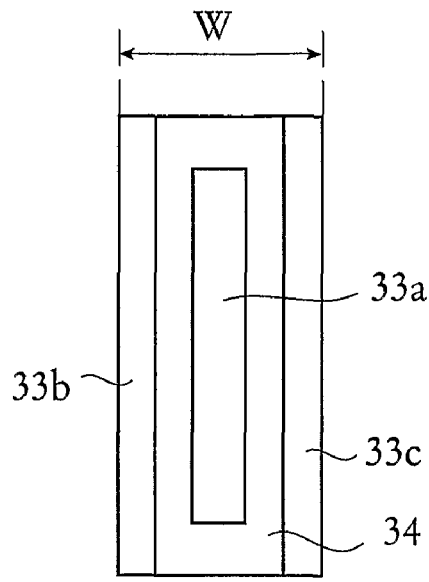
Figure 3C:
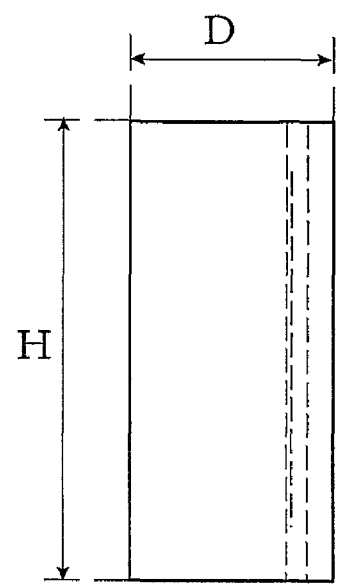
Figure 3D:
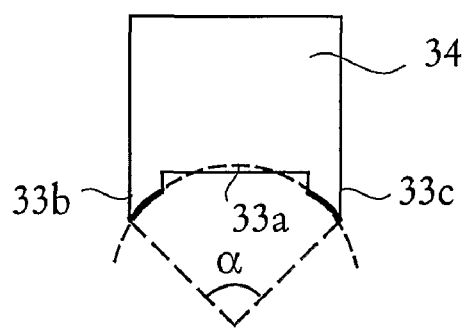
Figure 3E:
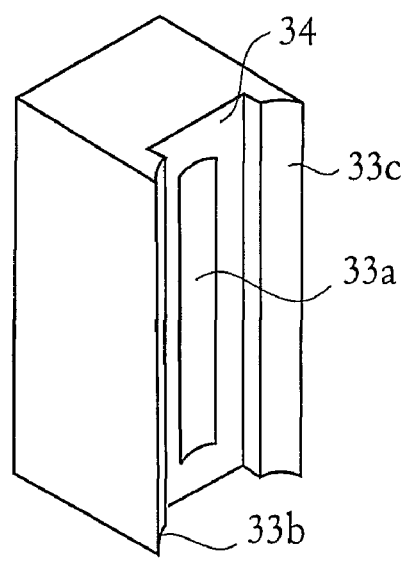

FIG. 3a illustrates the main components of the electromagnet 6 in a schematic top view. The coil 31, the electric circuit 32, and the magnetic core 33 are shown. FIGS. 3b-e illustrate the electromagnet 6 in front, side, top, and perspective views. The width W, the height H, and the depth D of the electromagnet are indicated. Note that FIGS. 3b-e illustrate the electromagnet in an implemented version, wherein the coil is not visible, but enclosed in a dielectric material 34, which also covers the top and bottom surfaces of the electromagnet 6.

In accordance with the present invention, the core 31 of the electromagnet comprises end portions 33a-c in a single face of the electromagnet 6, wherein the end portions 33a-c constitute different poles of the electromagnet 6 and are shaped to be engagable with each of the teat cups 5 in a close fit, and optionally also engagable with the cleaning teat cup 8 in a close fit.

Preferably, the end portions 33a-c of the magnetic core 33 are arranged to be in contact with a teat cup while the teat cup is gripped by the electromagnet 6. Possibly, however, the end portions 33a-c may be covered by a thin dielectric layer for protecting the surfaces of the magnetic core 33 and/or a teat cup while gripping the teat cup, or for reducing any noise occurring during gripping while the magnetic core surface is struck by the teat cup due to the strong magnetic attraction forces.

Each of the teat cups 5 comprises a cylindrical rigid shell and an internal flexible liner, which can be seen in FIG. 4a as details 41 and 42. The internal flexible liner 42 is located within the cylindrical rigid shell 41 and extends through the ends thereof as a sealing collar defining a teat receiving opening, and a milk tube, respectively. The cylindrical rigid shell 41 has preferably a substantially circular cross section, and to achieve the close-fitted engagement between the magnetic core 33 and the cylindrical rigid shell 41, the end portions 33a-c of the magnetic core 33 ought to be curved with a radius of curvature substantially equal to the radius of the cylindrical rigid shell 41.

Further, in order to achieve as good grip as possible the electromagnet 6 should have as large contact surface as possible toward the teat cup 5. The close-fitted engagement of the magnetic core 33 with the teat cup 5 may cover an angular spread α (see FIG. 3d wherein portion of the cross section of the teat cup 5 is indicated by the dashed line) of at least 15°, preferably at least 30°, more preferably at least 45°, and most preferably at least 60° of the circumference of the circular cross section of the teat cup 5.

Similarly, the electromagnet 6 ought to have a height H so that it can be engaged with the teat cup in a close fit along a major length of the teat cup. The height H of the electromagnet 6 is preferably at least 70, 80, or 90% of the length L of the exposed part of the cylindrical rigid shell 41 of the teat cup 5.

Preferably, the teat cup 5 is gripped so that an uppermost edge of the core 33 is in contact with the sealing collar of the internal flexible liner 42. In such manner the position of the teat cup 5 in the gripper 3 is well-defined and since the sealing collar extends out from the surface of the cylindrical rigid shell 41 it provides a support for the gripping, i.e. it prevents the teat cup 5 from slipping or sliding out of the grip. Alternatively, the teat cup 5 is equipped with other kind of protrusions or support structures to obtain a similar vertical supporting operation.

The magnetic core 33 of the electromagnet illustrated in FIGS. 3a-e has a substantially E-shaped cross section with three parallel legs 33a-c. The coil 31 surrounds the middle one 33a of the three parallel legs 33a-c, the end of which thus constitutes a pole of the electromagnet 6. The two other legs 33b-c constitute the other pole of the electromagnet 6. All three parallel legs 33a-c are shaped to engage with the teat cup 5 in a close fit along a major length of the teat cup.

The illustrated design, i.e. with elongated rather narrow legs, which are each parallel with an axial direction of the teat cup 5, is preferred since it provides for the best possible grip. However, the three legs could alternatively be located one after the other in this axial direction, wherein each of the legs is engaged in close fit with the teat cup 5 along the angular spread α of the circumference of the circular cross section of the teat cup 5.

The teat cleaning cup 8 may have a larger diameter or other shape than that of the teat cups 5. In order to be capable of using the same gripper device for the teat cups 5 as well as the teat cleaning cup 8, a tube of suitable diameter cut along its length may be welded to the teat cleaning cup 8 to constitute a suitable gripping surface for the gripper device. A top view of such a modified teat cleaning cup 8 is shown in FIG. 4b, where the cut tube of suitable diameter is denoted by 43.

Figure 5C:
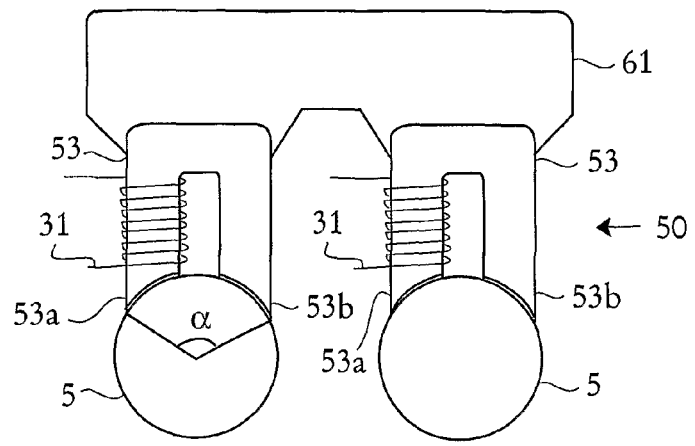

FIG. 5a-c illustrate, in top views, gripper devices according to further preferred embodiments.

The gripper device of FIG. 5a, denoted by 50, comprises a support structure 51 holding an electromagnet 50, which includes a substantially U-shaped magnetic core 51. The coil 31 is winded around at least one of the legs, and the end parts 51a-b of the substantially U-shaped magnetic core 51 are shaped to be engagable with the teat cup 5 in a close fit.

The gripper device of FIG. 5b, denoted by 55, comprises a support structure 56 holding an electromagnet 55, which includes a substantially C-shaped magnetic core 57. The coil 31 is winded around a central part of the magnetic core, which has a recess intended therefore, and the end parts 57a-b of the substantially C-shaped magnetic core 57 are shaped to be engagable with the teat cup 5 in a close fit, i.e. the C-shaped magnetic core 57 is shaped so that an inner surface thereof is circular with a radius similar to the radius of the teat cups 5.

The gripper device of FIG. 5c, denoted by 60, comprises a support structure 61 holding two electromagnets 50, each being e.g. of the kind illustrated in FIG. 5a. The distance between the two electromagnets are preferably adapted to the distance between adjacent ones of the teat cups 5 when being arranged in the teat cup rack 4 (see FIG. 1).

The gripper device of FIG. 5c is intended to illustrate the possibility of mounting several electromagnets in a single gripper device. The type of electromagnet in such a multi-magnet gripper may be of any kind as described herein, and such a gripper may include two, three, or four electromagnets for gripping two, three, or four teat cups at a time. Such multi-magnet gripper may fetch multiple teat cups 5 from the rack 4 and move them toward the teats of a cow to be milked. However, since typically each cow differs in size from one another, the attachment of the teat cups 5 to the teats of the cow has to be performed in a sequential order, i.e. one after the other.

The coils 31 of the electromagnets of the present invention may be fed by DC or AC current. In the latter case, the milking robot 2, or the gripper device 3 itself, may include detecting capabilities for detecting whether the gripper device 3 is holding a teat cup or not in its grip based on the inductance in the electromagnet.

In case a gripper device is designed for carrying multiple teat cups 5 at a time there may arise problems at re-attachment of a teat cup 5 that has been unintentionally removed during milking, e.g. kicked off, since such a gripper device may, due to its relative large size, knock other teat cups off the teats of the milking animal.

It is an object of the present invention to provide a gripper device that is capable of simultaneously carrying multiple teat cups and at the same time avoid problems of knocking off teat cups while re-attaching an unintionally removed teat cup.

The above object is attained by a gripper device having a first gripper for gripping multiple teat cups at a time; a second gripper for gripping a single teat cup at a time; and a movement mechanism for moving either one of the first and second grippers to an active grip position depending on whether multiple teat cups or a single teat cup is to be gripped at a time.

By such a gripper device, the first gripper may be used for gripping and carrying the teat cups during normal attachment, whereas the second gripper may be used for re-attachment of a teat cup unintentionally removed during milking.

Each of the grippers may be based on at least one electromagnet, or on any other kind of gripping technology known in the art. In the former case, the first gripper may be designed in accordance with any of the gripper devices as illustrated in FIGS. 2 and 5a-b, whereas the second gripper may be designed in accordance with any of the gripper devices disclosed with reference to FIG. 5c.

Figure 6A:
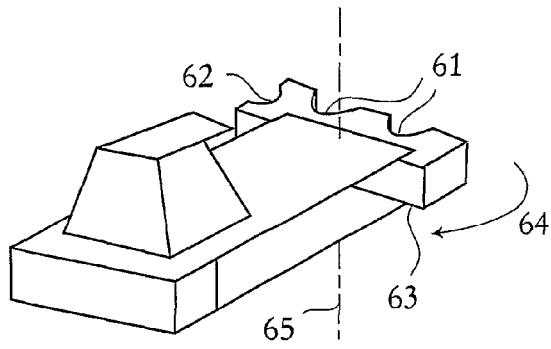
FIGS. 6a-b illustrate, in perspective views, a gripper device according to a still further preferred embodiment.
Figure 6B:
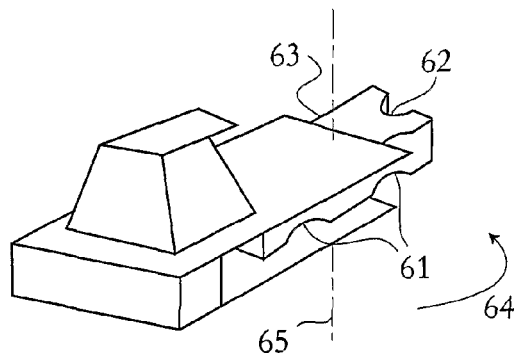

In FIGS. 6a-b a gripper device in accordance with the above outline is illustrated. The first 61 and second 62 grippers of the gripper device are rigidly arranged with respect to each other on different faces of a gripper member 63, and the first gripper 61 is shaped to be simultaneously engagable with multiple teat cups in a close fit and said second gripper 62 is shaped to be engagable with a single teat cup in a close fit. While the first gripper 61 in the illustrated embodiment is shaped to be simultaneously engagable with two teat cups, there is no restrictions whatsoever in this respect. The first gripper 61 may be designed to grip two, three, or even four teat cups at a time. However, the second gripper 62 should be designed to be capable to grip only one teat cup at a time in order to be capable of being made small and flexible, so that it is easily movable in close vicinity of the teat cups that are attached to the teats of the milking animal without knocking them off.

Further, a movement mechanism is provided for moving each of the first 61 and second 62 grippers into and out of the active grip position in a pivotal movement around an essentially vertical axis 65. The pivotal movement is indicated by arrows 64 in FIGS. 6*a-b*, and it may be effectuated in any manner known in the art. The first gripper 61 is arranged in the active grip position in FIG. 6*a*, whereas the second gripper 62 is arranged in the active grip position in FIG. 6*b*.

It shall be appreciated that while the movement mechanism in FIGS. 6*a-b* is adapted for pivotal movement, there is no restrictions whatsoever in this respect. Generally, the movement mechanism is provided for moving, in a rotational and/or translational movement, one of the first and second grippers to the active grip position, while the other one of the first and second grippers is moved to an inactive position, and vice versa.

Figure 7A:
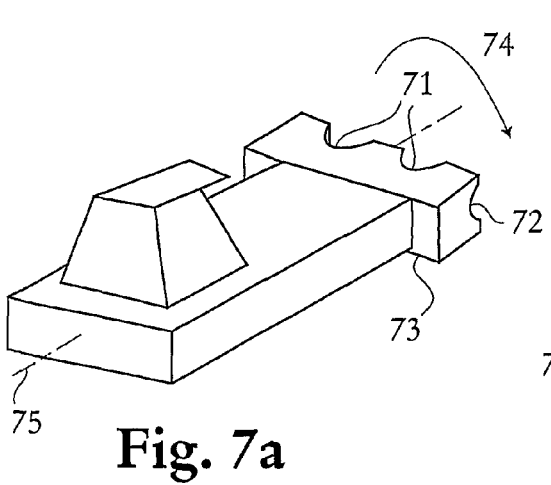
FIGS. 7a-b illustrate, in perspective views, a gripper device according to a yet further preferred embodiment.
Figure 7B:
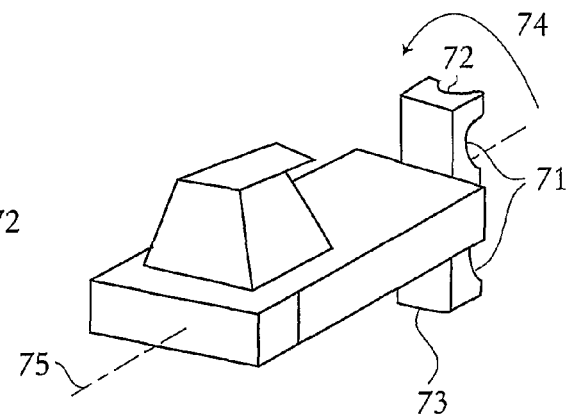

In FIGS. 7*a-b* a gripper device in accordance with an alternative embodiment of the invention is illustrated. Here the first 71 and second 72 grippers are arranged at a single face of the gripper member 73, and the movement mechanism is adapted for moving each of the first 71 and second 72 grippers into and out of the active grip position in an pivotal movement (indicated by arrows 74) around an essentially horizontal axis 75.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. A gripper device mountable on a robot arm of a milking robot for automatically attaching teat cups to teats of a milking animal, said gripper device comprising:
   an electromagnet for gripping the teat cups made of a magnetic material, said electromagnet including a coil feedable with a current and a core of a magnetic material arranged at least partly within said coil; and
   a support structure for holding said electromagnet, wherein said core includes two end portions in a single face of the electromagnet, the two end portions constituting different poles of the electromagnet; and
   said two end portions are shaped to be engagable with each of said teat cups in a close fit, wherein:
   said core has a substantially E-shaped cross section with three parallel legs;
   said coil surrounds a middle leg of said three parallel legs, and
   said three parallel lens are all shaped to engage with each of said teat cups in a close fit.

2. The gripper device of claim 1, wherein said two end portions are arranged to be in contact with said teat cups while said teat cups are gripped by said electromagnet.

3. The gripper device of claim 1, wherein said two end portions are covered by a thin dielectric layer.

4. The gripper device of claim 1, wherein
   each of said teat cups includes a cylinder with a substantially circular cross section; and
   said two end portions are curved with a radius of curvature substantially equal to the radius of said circular cross section.

5. The gripper device of claim 4, wherein the core of said electromagnet is shaped to be engagable with each of said teat cups in a close fit, said engagement covering an angular spread ($\alpha$) of at least 15° of the circumference of the circular cross section of each of said teat cups.

6. The gripper device of claim 5, wherein the core of said electromagnet is shaped to be engagable with each of said teat cups in a close fit, said engagement covering an angular spread ($\alpha$) of at least 30° of the circumference of the circular cross section of each of said teat cups.

7. The gripper device of claim 5, wherein the core of said electromagnet is shaped to be engagable with each of said teat cups in a close fit, said engagement covering an angular spread ($\alpha$) of at least 45° of the circumference of the circular cross section of each of said teat cups.

8. The gripper device of claim 5, wherein the core of said electromagnet is shaped to be engagable with each of said teat cups in a close fit, said engagement covering an angular spread ($\alpha$) of at least 60° of the circumference of the circular cross section of each of said teat cups.

9. The gripper device of claim 1, wherein the core of said electromagnet has a height (H) and is shaped to be engagable with each of said teat cups in a close fit along a major length of said teat cups.

10. The gripper device of claim 1, wherein said coil is feedable with a DC current.

11. The gripper device of claim 1, wherein said coil is feedable with an AC current.

12. The gripper device of claim 11, further comprising a detecting device for detecting whether said gripper device holds a teat cup or not based on the inductance in said electromagnet.

13. The gripper device of claim 1, wherein said electromagnet is adapted for gripping said teat cups one at a time.

14. The gripper device of claim 1, wherein said electromagnet is adapted for gripping a teat cleaning cup.

15. The gripper device of claim 1, further comprising:
   an additional electromagnet for gripping teat cups made of a magnetic material, said additional electromagnet including a coil feedable with a current and a core of a magnetic material arranged at least partly within the coil of the additional electromagnet, wherein
   said support structure is provided for holding said additional electromagnet;
   the core of said additional electromagnet includes two end portions in a single face of the additional electromagnet, the two end portions constituting different poles of the additional electromagnet; and
   the two end portions of the core of the additional electromagnet are shaped to be engagable with each of said teat cups in a close fit to allow said gripper device to grip two of said teat cups simultaneously.

16. The gripper device of claim 15, wherein the distance between the two electromagnets are adapted to the distance between adjacent ones of the teat cups when being arranged in a teat cup rack.

17. The gripper device of claim 1, further comprising:
   a first gripper element for gripping multiple teat cups at a time;
   a second gripper element for gripping a single teat cup at a time; and
   a movement mechanism for moving either one of said first and second gripper element to an active grip position depending on whether multiple teat cups or a single teat cup is to be gripped at a time.

18. The gripper device of claim 17, wherein said first and second gripper elements are rigidly mounted with respect to each other, and said movement mechanism is adapted for moving, in a translational or rotational movement, one of the said first and second gripper element to the active grip position, while moving the other one of said first and second gripper element to an inactive position, and vice versa.

19. The gripper device of claim 18, wherein each of said first and second gripper element is based on at least one electromagnet for gripping.

20. The gripper device of claim 18, wherein:
said first gripper element is shaped to be engagable with multiple teat cups in a close fit and said second gripper element is shaped to be engagable with a single teat cup in a close fit;
said first and second gripper elements being arranged at different faces of said gripper device; and
said movement mechanism is adapted for moving each of said first and second gripper element into and out of an active grip position in an pivotal movement around an essentially vertical axis.

21. The gripper device of claim 17, wherein:
said first gripper element is shaped to be engagable with multiple teat cups in a close fit and said second gripper element is shaped to be engagable with a single teat cup in a close fit;
said first and second gripper elements being arranged at a single face of said gripper device; and
said movement mechanism is adapted for moving each of said first and second gripper element into and out of an active grip position in a pivotal movement around an essentially horizontal axis.

22. A robot arm having the gripper device of claim 1 mounted thereon.

23. A milking robot comprising the robot arm of claim 22.

24. The milking robot of claim 23, wherein the milking robot is adapted, by aid of said gripper device, to fetch said teat cups from a rack intended to store said teat cups, to move said teat cups, and to attach said teat cups to the teats of a milking animal in a sequential order.

25. The milking robot of claim 23, wherein the milking robot is adapted, by aid of said gripper device, to fetch a teat cleaning device from a rack intended to store said teat cleaning device, to move said teat cleaning device to a position under the teats of a milking animal, and to lift said teat cleaning device, in a sequential order so that each of the teats of the milking animal is received by a teat receiving opening of said teat cleaning device.

26. The gripper device of claim 1, wherein
said two end portions are shaped to be physically engagable with said teat cups in a close fit.

27. A gripper device mountable on a robot arm of a milking robot for automatically attaching teat cups to teats of a mincing animal, said gripper device comprising:
an electromagnet for gripping the teat cups made of a magnetic material, said electromagnet including a coil feedable with a current and a core of a magnetic material arranged at least partly within said coil;
a support structure for holding said electromagnet, wherein said core includes two end portions in a single face of the electromagnet, the two end portions constituting different poles of the electromagnet;
said two end portions are shaped to be engagable with each of said teat cups in a close fit,
a first gripper element for gripping multiple teat cups at a time;
a second gripper element for gripping a single teat cup at a time; and
a movement mechanism for moving either one of said first and second gripper element to an active grip position depending on whether multiple teat cups or a single teat cup is to be gripped at a time.

28. The gripper device of claim 27, wherein said core has a substantially U-shaped or C-shaped cross section.

* * * * *